United States Patent
Stolz

(10) Patent No.: US 11,225,773 B2
(45) Date of Patent: Jan. 18, 2022

(54) DRAGLINE OVAL TWO-PIECE BUSHING

(71) Applicant: Caterpillar Inc., Peoria, IL (US)

(72) Inventor: Michael Robert Stolz, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 591 days.

(21) Appl. No.: 15/918,029

(22) Filed: Mar. 12, 2018

(65) Prior Publication Data

US 2019/0277006 A1    Sep. 12, 2019

(51) Int. Cl.
*E02F 9/00* (2006.01)
*E02F 3/58* (2006.01)
*F16C 17/02* (2006.01)
*B25B 27/06* (2006.01)
*F16C 43/02* (2006.01)
*F16C 33/04* (2006.01)
*F16C 11/04* (2006.01)

(52) U.S. Cl.
CPC .............. *E02F 9/006* (2013.01); *B25B 27/06* (2013.01); *E02F 3/58* (2013.01); *F16C 11/04* (2013.01); *F16C 17/02* (2013.01); *F16C 33/04* (2013.01); *F16C 43/02* (2013.01); *F16C 2350/26* (2013.01)

(58) Field of Classification Search
CPC .... E02F 9/006; E02F 3/48; E02F 3/58; B25B 27/06; F16C 35/02; F16C 2226/50; F16C 11/045; Y10T 403/32901; Y10T 403/32918; Y10T 403/32926; Y10T 403/4614; Y10T 403/4617; Y10T 403/4637; Y10T 403/7047; Y10T 403/7061; Y10T 403/7182; Y10T 403/7188; Y10T 403/7009; Y10T 403/7011

USPC ........ 16/2.1, 2.3, 2.4; 403/291; 384/447, 26, 384/29, 95

See application file for complete search history.

(56) References Cited

U.S. PATENT DOCUMENTS

| 62,189 | A | * | 2/1867 | Fetter | B65D 39/084 |
| | | | | | 16/2.4 |
| 311,345 | A | * | 1/1885 | MacIlvaine | B65D 39/084 |
| | | | | | 16/2.4 |
| 759,126 | A | * | 5/1904 | Christensen | B65D 39/084 |
| | | | | | 16/2.4 |
| 3,516,136 | A | * | 6/1970 | Carter et al. | F16C 35/02 |
| | | | | | 29/898.07 |

(Continued)

FOREIGN PATENT DOCUMENTS

| JP | 2008246647 | 10/2008 |
| JP | 2008290224 | 12/2008 |

(Continued)

*Primary Examiner* — Josh Skroupa
*Assistant Examiner* — Alexus Camero
(74) *Attorney, Agent, or Firm* — Leydig, Voit & Mayer, Ltd.

(57) ABSTRACT

A bushing assembly comprises a flanged bushing including a flange portion including a flange anti-rotation feature, and a shaft portion with an outer cylindrical surface extending from the flange portion, terminating at a free end, the outer cylindrical surface including external threads disposed proximate the free end, and a retaining ring including an annular configuration defining an inner cylindrical surface defining internal threads complimentarily shaped to mate with the external threads of the outer cylindrical surface.

8 Claims, 6 Drawing Sheets

(56) References Cited

U.S. PATENT DOCUMENTS

| | | | | |
|---|---|---|---|---|
| 4,134,175 | A * | 1/1979 | Contoyanis | F16C 33/08 |
| | | | | 16/2.1 |
| 4,337,614 | A * | 7/1982 | Briscoe | F16G 15/06 |
| | | | | 411/518 |
| 4,614,444 | A * | 9/1986 | Hines | B62D 1/16 |
| | | | | 384/138 |
| 5,007,746 | A * | 4/1991 | Matzelle | F16C 17/04 |
| | | | | 384/420 |
| 7,762,758 | B2 * | 7/2010 | Sharpe | F16C 33/04 |
| | | | | 414/722 |
| 8,469,622 | B2 * | 6/2013 | McClanahan | F16B 19/00 |
| | | | | 403/154 |
| 9,115,742 | B2 | 8/2015 | McClanahan et al. | |
| 9,458,889 | B2 * | 10/2016 | Thomas | F16C 17/04 |
| 9,587,668 | B2 * | 3/2017 | Jia | F16B 21/16 |
| 9,702,407 | B2 | 7/2017 | Knuth | |
| 10,364,545 | B2 * | 7/2019 | Gonzalez | E02F 3/3636 |
| 2004/0265054 | A1 * | 12/2004 | Naudet | F16C 11/045 |
| | | | | 403/409.1 |
| 2010/0154162 | A1 * | 6/2010 | Blanco | F16C 35/02 |
| | | | | 16/2.1 |
| 2011/0110708 | A1 * | 5/2011 | Miotke | E02F 3/58 |
| | | | | 403/64 |
| 2012/0279014 | A1 * | 11/2012 | Carlsson | F16C 23/10 |
| | | | | 16/273 |
| 2016/0290391 | A1 * | 10/2016 | Hill | F16C 11/045 |
| 2016/0348712 | A1 * | 12/2016 | Stolz | E02F 9/006 |

FOREIGN PATENT DOCUMENTS

| | | |
|---|---|---|
| KR | 2019890008392 | 11/1989 |
| KR | 200282453 | 7/2002 |

* cited by examiner

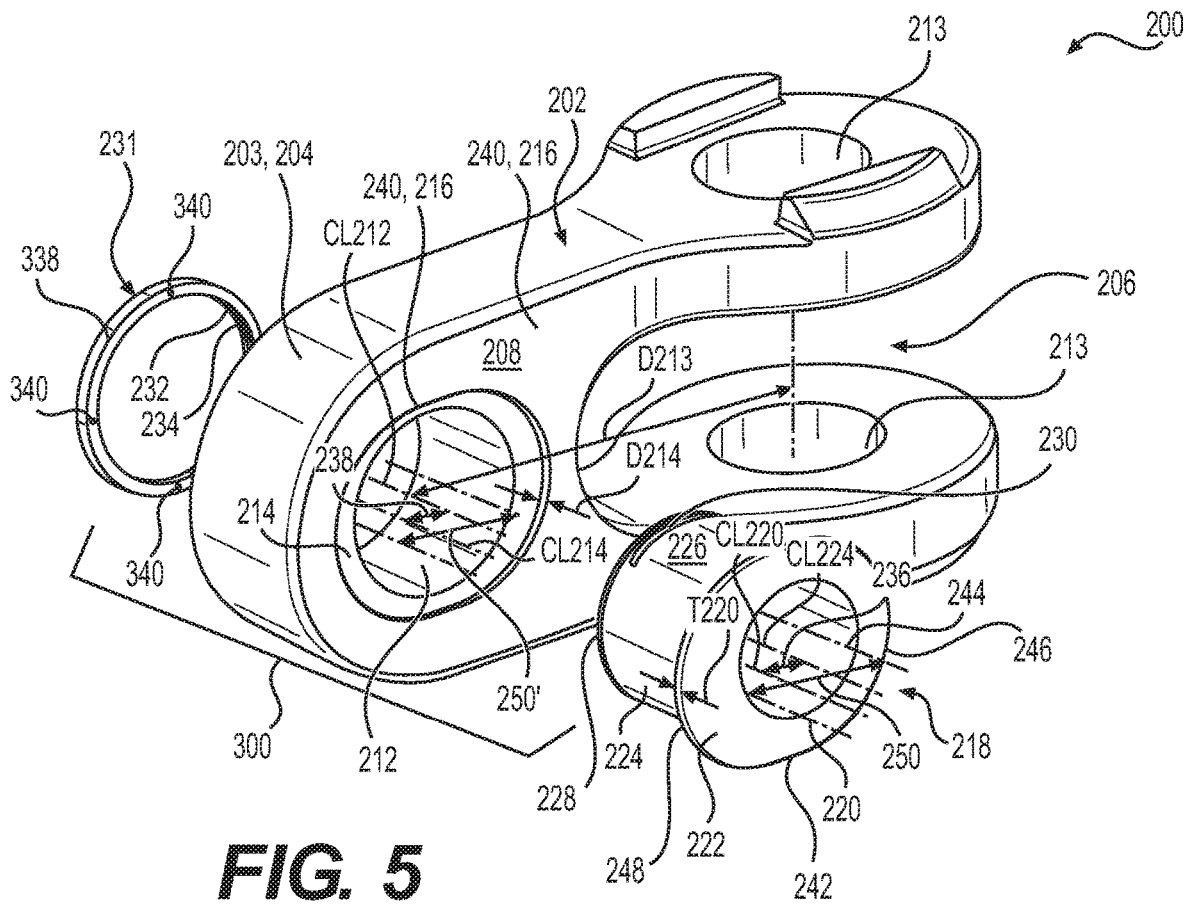
FIG. 5
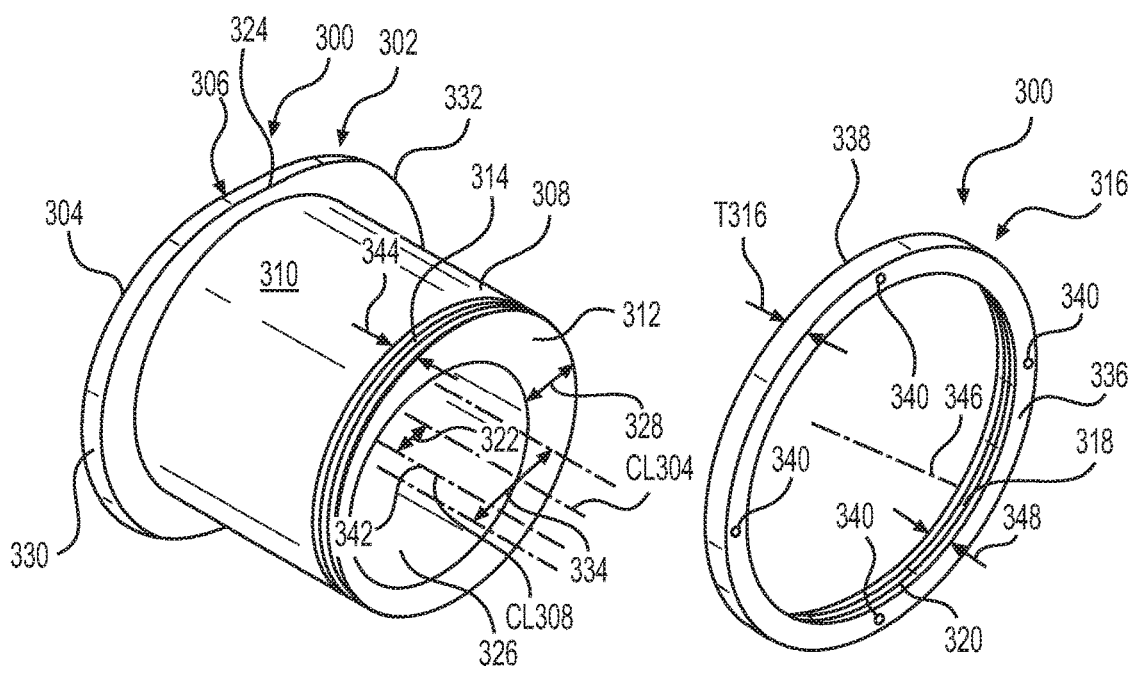
FIG. 6
FIG. 7

DRAGLINE OVAL TWO-PIECE BUSHING

TECHNICAL FIELD

The present disclosure relates to chain assemblies that are used in dragline mining operations and the like. More specifically, the present disclosure relates to a dragline bucket chain assembly that includes a rigging link with a bushing often used with trunnion type connections to a bucket or the like.

BACKGROUND

Historically bushings are used in dragline bucket rigging as a wear item. More specifically, the bushings are inserted into the bore of the male portion of a rigging link to support the loads exerted on the rigging link. The bushings are replaced as wear occurs. The bushings are often made of hardened steel or manganese alloyed steel.

These bushings may be held in place in the bore using various techniques. For example, the bushings can be pressed-in, inserted using a slip fit and then welded into place, etc. Welding can cause the replacement process to be time consuming and expensive. If welding is used to attach a bushing made of manganese, then a stainless weld electrode is required. Using a stainless steel electrode can produce a lot of smoke that can be bothersome to the welder or others in the work area. Also, the amount of time necessary to install the bushing using a welding process is long, requiring the bucket to be out of production for an undesirable amount of time.

On the other hand, if the bushing is pressed into the bore, then the bushing needs to be lanced to be replaced. This too can be time consuming, causing the bucket to be out of production for an undesirable amount of time. For example, it is often necessary to chill down the bushing (to shrink the bushing) so it can be pressed into the bore easier. This requires liquid nitrogen or the like, necessitating that equipment that can be expensive be purchased or sometimes this equipment is unavailable in the field.

Accordingly, it is desirable to develop a better method for attaching a bushing to a rigging link of a dragline bucket chain assembly or the like.

SUMMARY OF THE DISCLOSURE

A rigging link assembly according to an embodiment of the present disclosure comprises a rigging link member including a tang portion including a first side surface, a second side surface and defining a thru-bore extending through the first side surface and the second side surface, the tang portion further defining a pocket with a pocket anti-rotation feature on the first side surface. A flanged bushing including a flange portion including a flange anti-rotation feature configured to engage the pocket anti-rotation feature is provided. The flanged bushing also includes a shaft portion with an outer cylindrical surface extending from the flange portion, terminating at a free end, and the outer cylindrical surface includes external threads disposed proximate the free end. A retaining ring including an annular configuration defines an inner cylindrical surface defining internal threads complimentarily shaped to mate with the external threads of the outer cylindrical surface.

A bushing assembly according to an embodiment of the present disclosure comprises a flanged bushing including a flange portion including a flange anti-rotation feature, and a shaft portion with an outer cylindrical surface extending from the flange portion, terminating at a free end, the outer cylindrical surface including external threads disposed proximate the free end. The bushing assembly further comprises a retaining ring including an annular configuration defining an inner cylindrical surface defining internal threads complimentarily shaped to mate with the external threads of the outer cylindrical surface.

A tool for attaching or detaching a retaining ring to a flanged bushing according to an embodiment of the present disclosure is provided. The tool comprises a flat annular circular plate defining a circumferential direction, a radial direction, an axial direction, an outer diameter and an inner diameter, and including a plurality of cross-members extending from one side of the inner diameter to the other side of the inner diameter, and a plurality of bosses extending axially from the flat annular circular plate.

BRIEF DESCRIPTION OF THE DRAWINGS

FIG. 5 is a front exploded assembly view of the rigging link assembly and two-piece bushing assembly of FIG. 2.

FIG. 6 is a perspective view of the flanged bushing member of the two-piece bushing assembly of FIG. 4 shown in isolation.

FIG. 7 is a perspective view of the retaining ring of the two-piece bushing assembly of FIG. 4 shown in isolation.

DETAILED DESCRIPTION

Figure 1:
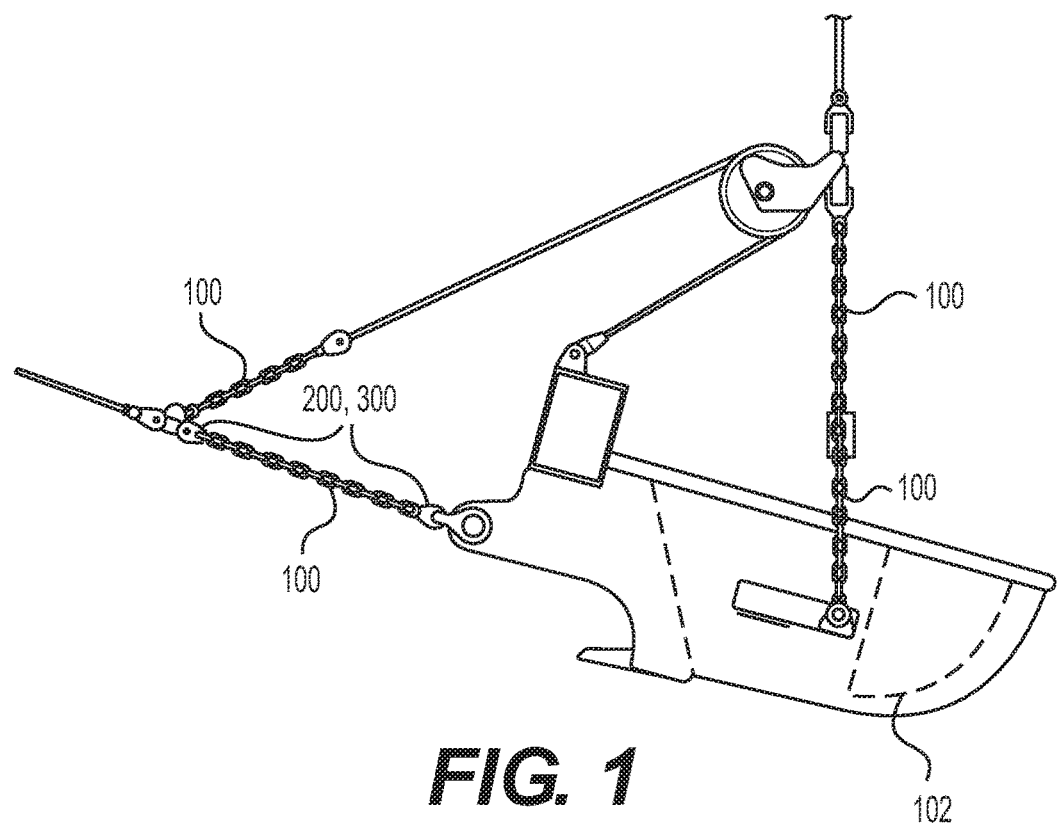
FIG. 1 is a side view of a dragline bucket that is suspended and pulled using chains using various embodiments of a two-piece bushing assembly according to the present disclosure.
Figure 2:
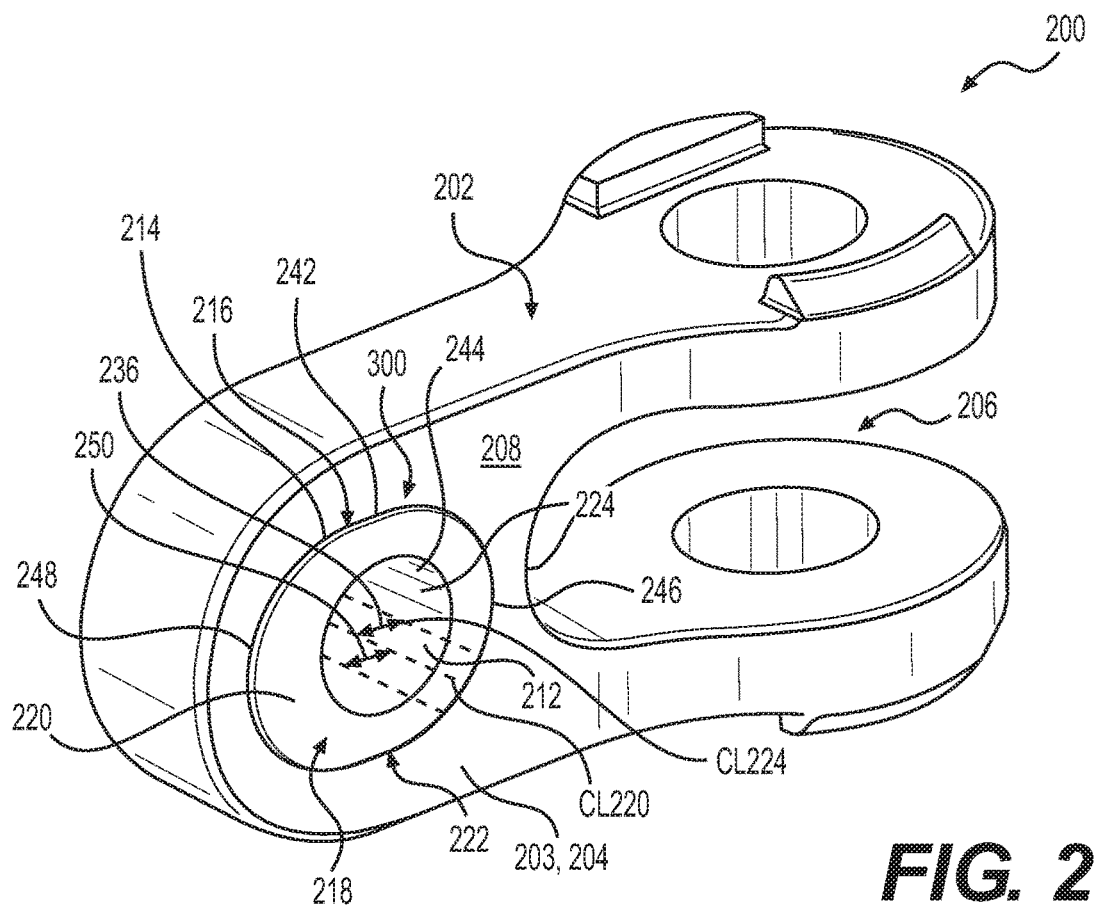
FIG. 2 is a front perspective view of a rigging link assembly using a two-piece bushing assembly according to an embodiment of the present disclosure that may be used with the chain of FIG. 1.
Figure 3:
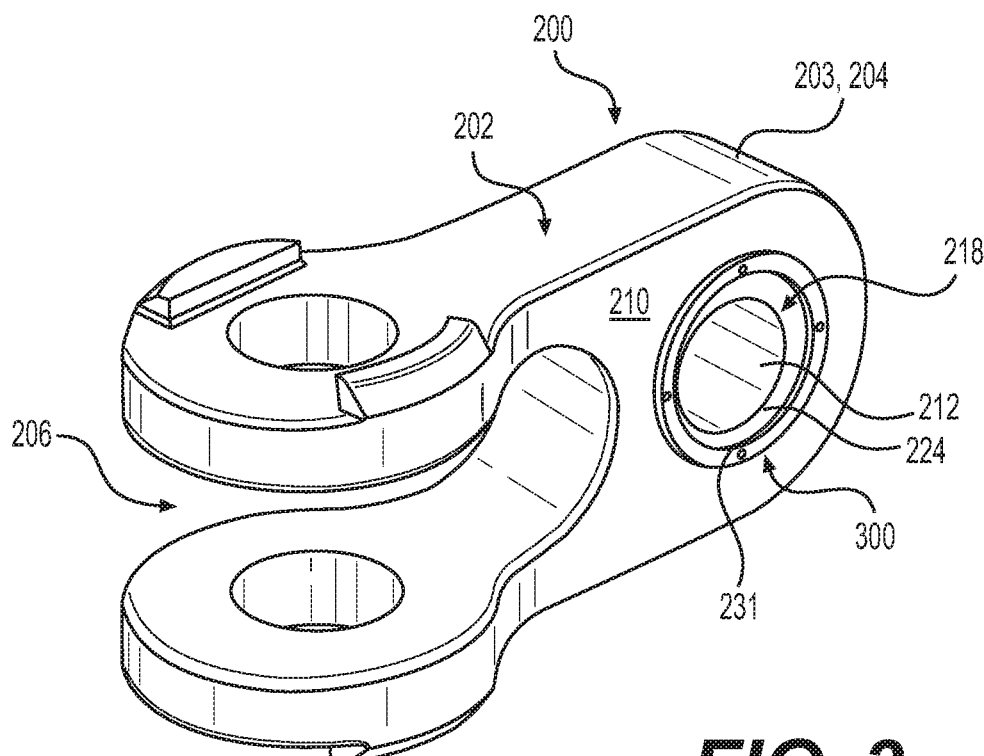
FIG. 3 is a rear perspective view of the rigging link assembly and the two-piece bushing assembly of FIG. 2.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

In various embodiments, a chain assembly, a rigging link assembly, a bushing assembly, and a tool for assembling and disassembling the rigging link assembly may be provided. This may make it easier to install or repair a chain assembly, a rigging link assembly, a bushing assembly, etc. without needing to press fit or weld a bushing in place.

Looking at FIG. 1, a rigging chain 100 that may use a rigging link assembly 200 and/or a bushing assembly 300 according to various embodiments of the present disclosure is shown. The rigging chain 100 may be used in conjunction with a dragline bucket 102 to lift, lower, or cause the bucket to engage earth or other work material, etc. It is to be understood that any chain may use various rigging link assemblies 200, tools 400 (see FIG. 10 for an example) and bushing assemblies 300 as will now be described.

Looking at FIGS. 2 thru 5, a rigging link assembly according to various embodiments of the present disclosure will now be described. The rigging link assembly 200 may comprise a rigging link member 202 including a tang portion 203 of the male portion 204 and a female yoke portion 206. The tang portion 203 of the male portion 204 includes a first side surface 208, a second side surface 210 and defines a thru-bore 212 extending through the first side surface 208 and the second side surface 210. Furthermore, the tang portion 203 of the male portion 204 further defines a pocket 214 with a pocket anti-rotation feature 216 on the first side surface 208. The distance D213 (see FIG. 5) from centerline of the thru-bore 212 to the centerline of the female yoke bores 213 may be 18 inches in some embodiments. The rigging link member 202 may be made from a cast alloy steel such as a composition including nickel and/or molybdenum. Any of the dimensions or materials discussed herein for any component may be varied as needed or desired in other embodiments to be different than what is specifically mentioned.

While the tang portion of the male portion is shown in the FIGS. of the present application to have the features suitable for using a bushing according to various embodiments if the present application, it is to be understood that tang portion of a female portion of a rigging link may also have the same or similar features and a bushing according to various embodiments of the present disclosure may be used with the female portion as well.

The rigging link assembly 200 may further comprise a flanged bushing 218 including a flange portion 220 including a flange anti-rotation feature 222 configured to engage the pocket anti-rotation feature 216, and a shaft portion 224 with an outer cylindrical surface 226 extending from the flange portion 220, terminating at a free end 228. The outer cylindrical surface 226 may include external threads 230 disposed proximate the free end 228.

The rigging link assembly 200 may further comprise a retaining ring 231 including an annular configuration defining an inner cylindrical surface 232 defining internal threads 234 complimentarily shaped to mate with the external threads 230 of the outer cylindrical surface 226 of the shaft portion 224 of the flanged bushing 218.

More specifically, the flange portion 220 of the flanged bushing 218 may define a flange centerline CL220 (relative to the perimeter of the flange 220) and the shaft portion 224 may define a shaft centerline CL224 (relative to the perimeter of the shaft 224) that is offset (see offset distance 236) relative to the flange centerline CL220. The flange portion 220 may define a flat portion 242 and the flanged bushing 218 may define a thru-hole 244 extending through the flange portion 220 and the shaft portion 224. As shown in FIGS. 2 thru 5, the flange portion 220 may include a first circular portion 246 concentric with the thru-hole 244, a second circular portion 248 offset (see offset distance 250, a similar offset distance 250' is present in the pocket 214 of the rigging link member 202) from the first circular portion 246, and the flat portion 242 connects the first circular portion 246 to the second circular portion 248.

Focusing now on the rigging link member 202 in FIG. 5, the pocket anti-rotation feature 216 may include at least one of the following features. For example, the thru-bore 212 may define a thru-bore centerline CL212 and the pocket 214 may define a pocket centerline CL214 (relative to the perimeter of the pocket 214) that is offset (see offset distance 238, which may be approximately the same as offset distance 236 when the rigging link assembly 200 is assembled) from the thru-bore centerline CL212.

In some embodiments, the pocket 214 may define a flat surface 240. In still further embodiments, such as shown in FIGS. 2 thru 5, both types of anti-rotation features 216 are provided. As can be best seen in FIGS. 2 and 5, the pocket 214 of the rigging link member 202 may be complimentarily shaped to the flange portion 220 of the flanged bushing 218.

Figure 12:
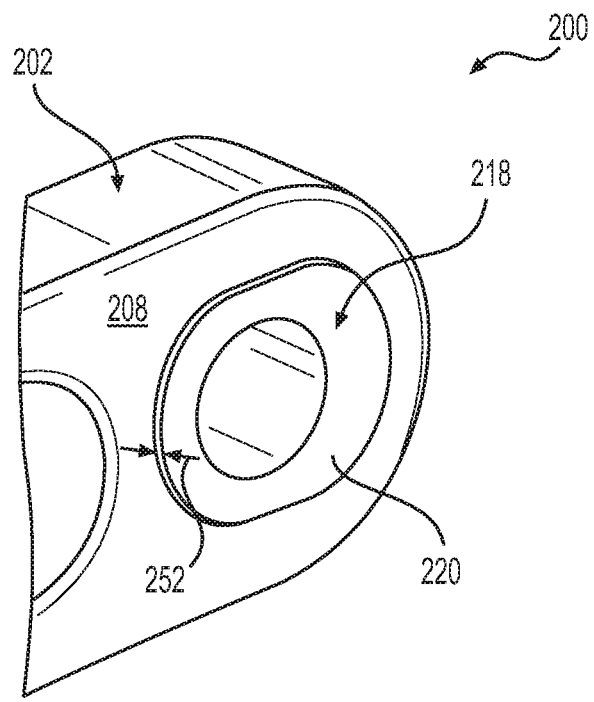
FIG. 12 is an enlarged perspective view showing the flanged bushing member installed in the bore of the tang portion of the male portion of the rigging link, being slightly proud relative to a side surface of the rigging link.

With continued reference to FIG. 5, the pocket 214 may define a pocket depth D214 and the flange portion 220 of the flanged bushing 218 may define a flange thickness T220. The flange thickness T220 may exceed the pocket depth D214. As a result, FIG. 12 indicates that the flange portion 220 is proud relative to the first side surface 208 by a suitable distance 252 (e.g. 0.125 inches). This allows the flange portion 220 to provide a wear surface.

Figure 4:
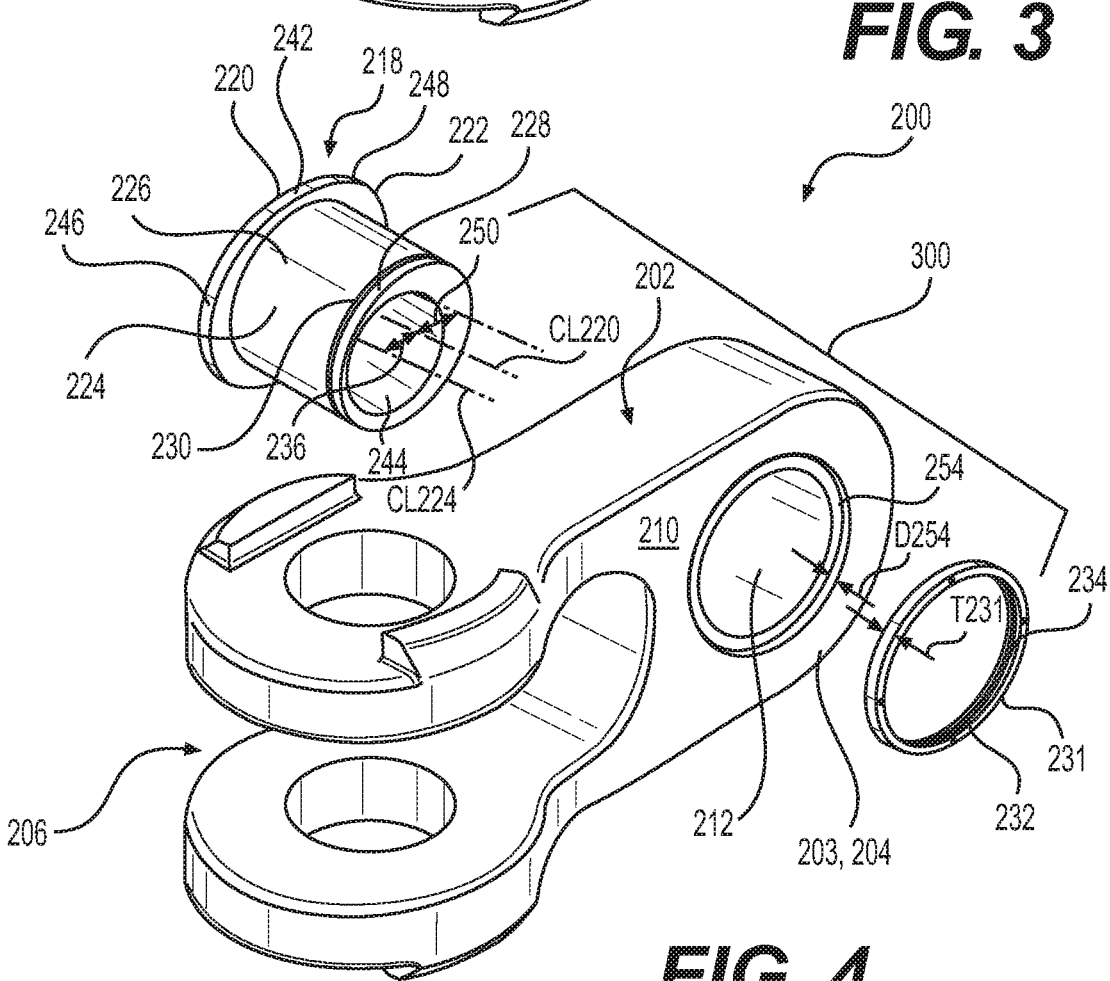
FIG. 4 is a rear exploded assembly view of the rigging link assembly and two-piece bushing assembly of FIG. 2.
Figure 13:
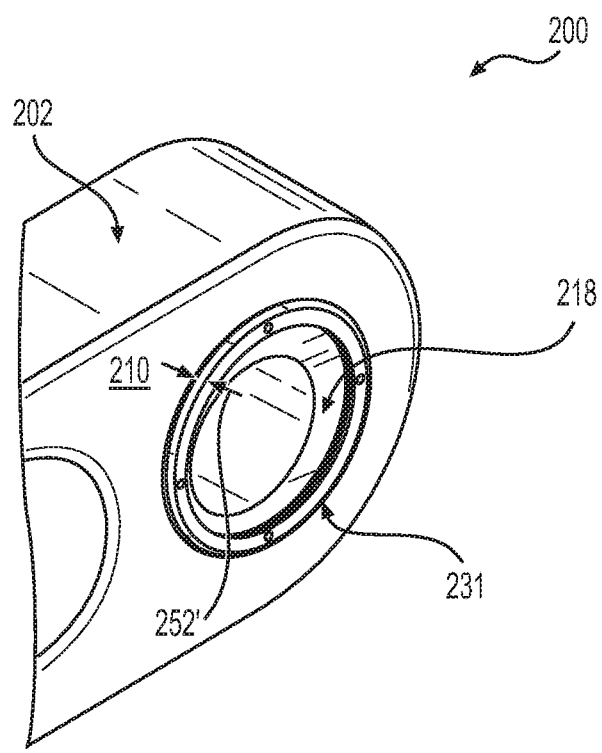
FIG. 13 is an enlarged perspective view showing the retaining ring installed into the tang portion of the male portion of the rigging link, being slightly proud relative to a side surface of the rigging link.

Similarly, as shown FIGS. 4 and 13, the second side surface 210 may define a counterbore 254 defining a counterbore depth D254 and the retaining ring 231 may define a ring thickness T231 that exceeds the counterbore depth D254. Consequently, the retaining ring 231 is proud relative to the second side surface 210 by a suitable distance 252' (e.g. 0.125 inches). This allows the retaining ring 231 to provide a wear surface.

Referring now to FIGS. 6 and 7, a bushing assembly 300 according to an embodiment of the present disclosure that may be provided as part of a repair kit or the like will be described. The bushing assembly 300 may comprise a flanged bushing 302 including a flange portion 304 including a flange anti-rotation feature 306 configured to engage the pocket anti-rotation feature 216 (as shown in FIG. 5), and a shaft portion 308 with an outer cylindrical surface 310 extending from the flange portion 304, terminating at a free end 312. The outer cylindrical surface 310 may include external threads 314 disposed proximate the free end 312. The entire outer cylindrical surface 310 may be threaded or only a portion thereof.

The bushing assembly 300 may also include a retaining ring 316 includes an annular configuration defining an inner cylindrical surface 318 defining internal threads 320 complimentarily shaped to mate with the external threads 314 of the outer cylindrical surface 310.

Referring back to FIG. 6, the flange portion 304 of the flanged bushing 302 defines a flange centerline CL304 and the shaft portion 308 defines a shaft centerline CL308 that is offset (see offset distance 322) relative to the flange centerline CL304. The flange portion 304 of the flanged bushing 302 defines a flat portion 324. Furthermore, the flanged bushing 302 defines a thru-hole 326 extending through the flange portion 304 and the shaft portion 308. The thru-hole 326 is also offset relative to the shaft portion 308, creating a thickened wall 328 for absorbing loads exerted on the flanged bushing 302 in use on a chain assembly 100. The diameter of the flange portion 304 may range from 3 inches to 18 inches and the diameter of the thru-hole 326 may range from 2 inches to 16 inches in various embodiments. These dimensions may be varied as needed or desired to have other values in other embodiments.

As alluded to earlier herein, the flange portion 304 of the flanged bushing 302 includes a first circular portion 330 concentric with the thru-hole 326, a second circular portion 332 offset (see offset distance 334) from the first circular portion 330, and the flat portion 324 connects the first circular portion 330 to the second circular portion 332.

Looking now at FIG. 7, the retaining ring 316 includes a circular annular configuration, a first annular end face 336, and a second annular end face 338, defining a ring thickness T316 therebetween. As shown in FIG. 7, the first annular end face 336 defines a plurality of apertures 340. As can be appreciated by looking at FIGS. 5 and 7 together, the plurality of apertures 340 extend through the ring thickness T316 from the first annular end face 336 to the second annular end face 338. This allows the retaining ring 316 to be reversible in use.

Referring now to FIGS. 6 and 7, the shaft portion 308 defines a shaft cylindrical axis 342 and the external threads 314 extend a first axial length 344. Similarly, and the retaining ring 316 defines a ring cylindrical axis 346 and the internal threads 320 extend a second axial length 348 (may have the same value as T316), and a ratio of the first axial length 344 to the second axial length 348 may range from 1.5 to 2.0. In some embodiments, the majority of the shaft portion is unthreaded to provide a suitable bearing surface when a pin is inserted into the bore of the bushing.

The flanged bushing 302 made be made from a steel with manganese and the retaining ring 316 may be made from a material similar or dissimilar to either the flanged bushing 302 or the rigging link member 202. Any suitable material may be used to fabricate any component discussed herein.

Turning now to FIGS. 8 thru 11, a tool for attaching or detaching a retaining ring to a flanged bushing is provided. The tool 400 may comprise a flat annular circular plate 402 defining a circumferential direction C, a radial direction R, an axial direction A, an outer diameter 404 and an inner diameter 406. A plurality of cross-members extending from one side of the inner diameter 406 to the other side of the inner diameter 406. Four bosses 410 extending axially from the flat annular circular plate 402.

Four cross-members 408 may be provided, creating an array of cross-members spaced from each other circumferentially at ninety-degree intervals and may be in phase circumferentially with the four bosses 410.

A plurality of lever arms 412 may also be provided that extend radially past the outer diameter 404 of the plate 402. More particularly, four lever arms 412 may be provided, creating an array of lever arms 412 spaced from each other circumferentially at ninety-degree intervals. The lever arms 412 may be in phase circumferentially with the four bosses 410. Optionally, the lever arms 412 may further include axial extending portions 414 that extend in a direction opposite to the direction that the four bosses 410 extend. This may give the assembler space away from a side surface 210 of the rigging link member 202 when attaching or detaching the retaining ring 316 to a flanged bushing 302 as will now be discussed.

Figure 8:
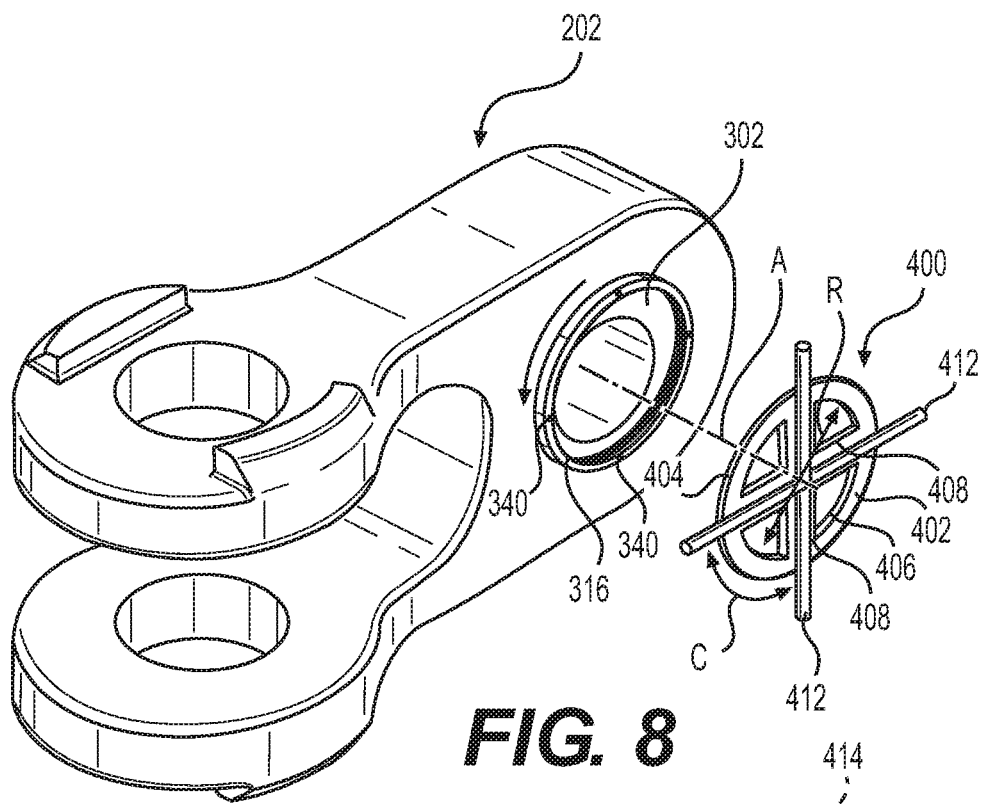
FIG. 8 shows how a tool may be placed onto the retaining ring of the two-piece bushing assembly of FIG. 3 for unscrewing the retaining ring from the flanged bushing member.

FIG. 8 shows the tool 400 being placed onto the retaining ring 316 such that its bosses 410 (not shown in FIG. 8 but may be understood with reference to FIG. 9) are inserted in the apertures 340 of the retaining ring 316. Then, the tool 400 would rotate counterclockwise to remove the retaining ring 316.

Figure 9:
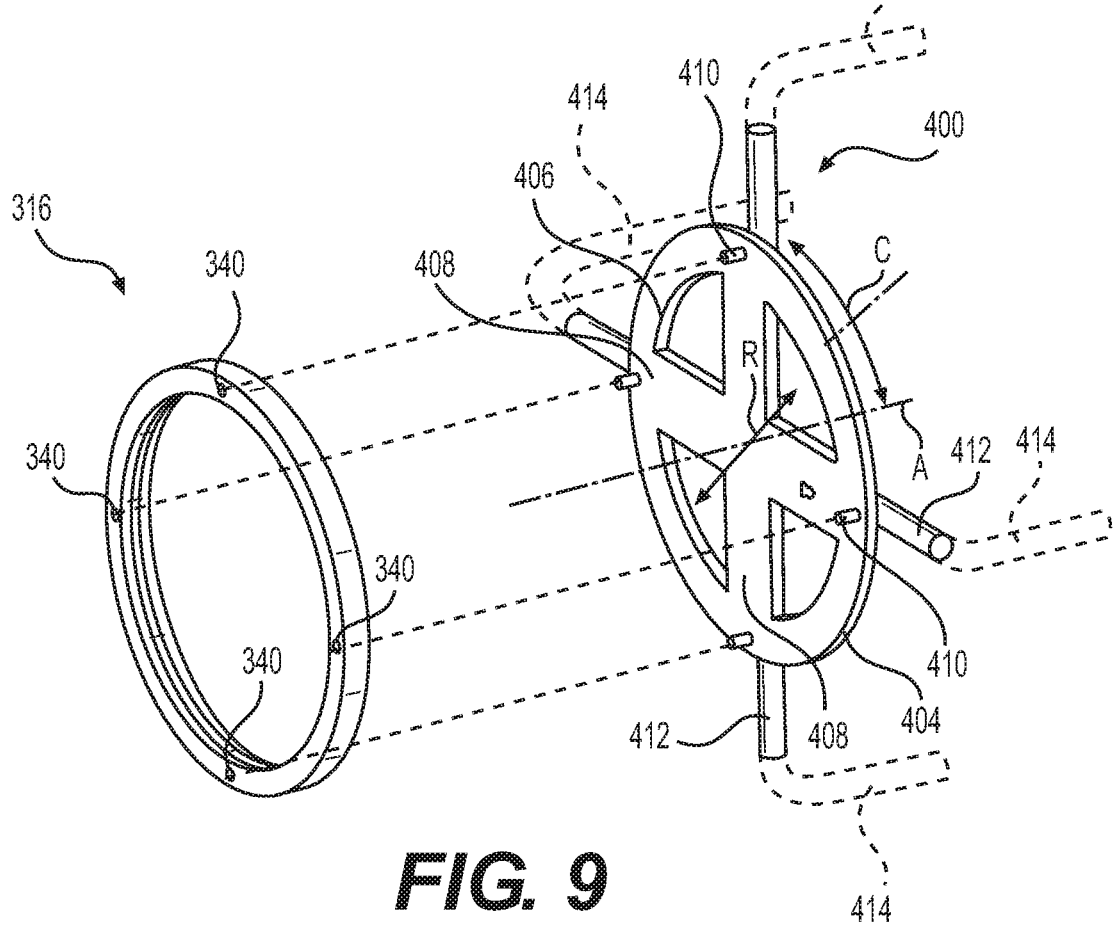
FIG. 9 illustrates a tool mating with the retaining ring before screwing the threaded flange member onto the flanged bushing member.
Figure 10:
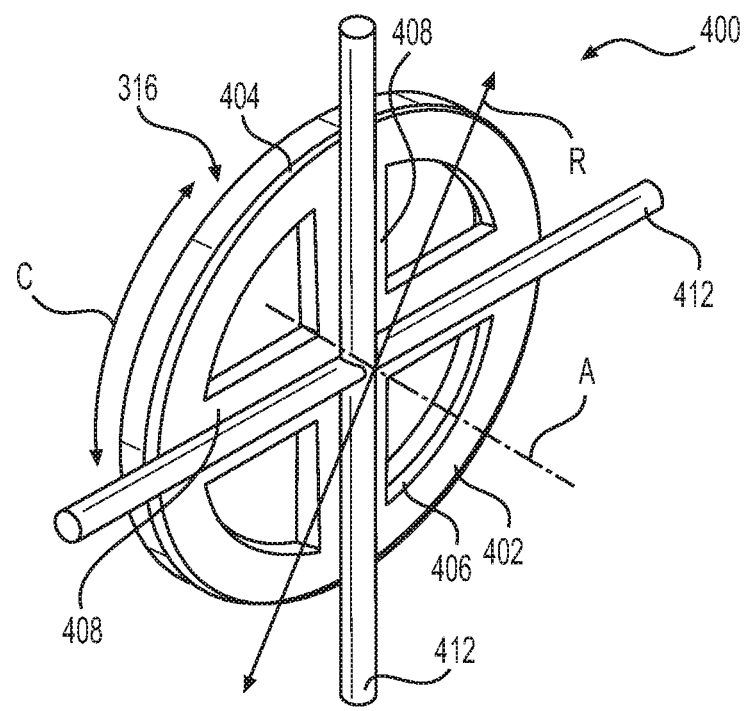
FIG. 10 shows the retaining ring and the tool of FIG. 9 after being mated.
Figure 11:
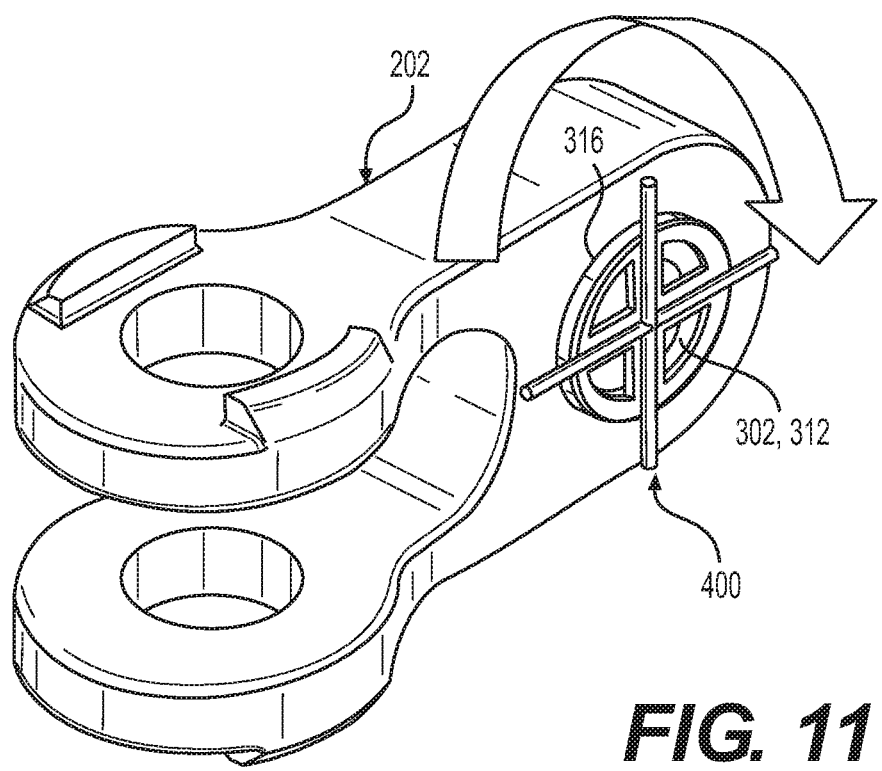
FIG. 11 depicts the retaining ring being tightened onto the flanged bushing member.

FIG. 9 illustrates the tool 400 assembled onto the retaining ring 316 by aligning and inserted the bosses 410 into the apertures 340 of the retaining ring 316, forming the assembly shown in FIG. 10. Once the assembly shown in FIG. 10 is formed, the retaining ring 316 may be attached to the flanged bushing 302 by rotating the retaining ring 316 clockwise onto the free end 312 of the flanged bushing 302.

The tool 400 may be fabricated by machining a plate 402 and then welding bar stock cut to length to form the bosses 410 and the lever arms 412. The lever arms 412 may be bent to provide the axial extending portions 414 and then welded or otherwise be attached to the plate 402.

INDUSTRIAL APPLICABILITY

In practice, a chain, a rigging link, a bushing assembly, a flanged bushing, a retaining ring, and/or a tool according to any embodiment described, shown or discussed herein may be sold, bought, manufactured, remanufactured, retrofitted, assembled or otherwise obtained in an aftermarket or OEM context.

With various embodiments discussed herein, field replacement of a flanged bushing as it wears may be easily and inexpensively performed in the field. Special equipment such as press fitting apparatus, cooling apparatus for shrinking the bushing, welding equipment, may be unnecessary.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A rigging link assembly comprising:
   a rigging link member including a male portion and a female portion, the male portion having a tang portion including a first side surface, a second side surface and defining a thru-bore extending through the first side surface and the second side surface, the tang portion further defining a pocket with a pocket anti-rotation feature on the first side surface, the female portion including a female yoke portion defining two, aligned female yoke bores extending perpendicularly relative to the thru-bore;
   a flanged bushing including a flange portion defining a flange centerline, the flange portion including a flange anti-rotation feature configured to engage the pocket anti-rotation feature, a shaft portion defining a shaft centerline and having an outer cylindrical surface extending from the flange portion, and a thru-hole defined along the shaft portion, the thru-hole defining hole centerline;
   wherein the thru-hole is offset within the shaft portion such that the shaft centerline and hole centerline are disposed in parallel and at an offset distance to create a thickened wall around the thru-hole on one side of the shaft portion, the thickened wall being oriented opposite the female yoke portion;
   wherein the flange anti-rotation feature is peripherally defined around the flange portion by a first circular portion that is concentric with the thru-hole, a second circular portion that is offset from the first circular portion and eccentric with the thru-hole, and flat portions that peripherally and tangentially connect the first and second circular portions;
   wherein the outer cylindrical surface terminates at a free end, the outer cylindrical surface including external threads disposed proximate the free end; and
   a retaining ring including an annular configuration defining an inner cylindrical surface defining internal threads complimentarily shaped to mate with the external threads of the outer cylindrical surface.

2. The rigging link assembly of claim 1, wherein the shaft centerline is offset relative to the flange centerline.

3. The rigging link assembly of claim 2, wherein the flanged bushing defines the thru-hole extending through the flange portion and the shaft portion.

4. The rigging link assembly of claim 3, wherein the second circular portion is eccentric with the shaft portion.

5. The rigging link assembly of claim 4, wherein the pocket of the rigging link member is complimentarily shaped to the flange portion of the flanged bushing.

6. The rigging link assembly of claim 1, wherein the anti-rotation feature of the pocket includes at least one of the following:
   the thru-bore defines a thru-bore centerline and the pocket defines a pocket centerline that is offset from the thru-bore centerline; and
   the pocket defines flat surfaces along an inner periphery thereof that accommodate the flat portions disposed on an outer periphery of the flange anti-rotation feature of the flange portion.

7. The rigging link assembly of claim 1, wherein the pocket defines a pocket depth, the flange portion of the flanged bushing defines a flange thickness, and the flange thickness exceeds the pocket depth.

8. The rigging link assembly of claim 1, wherein the second side surface defines a counterbore defining a counterbore depth and the retaining ring defines a ring thickness that exceeds the counterbore depth.

* * * * *